(12) United States Patent
Schleicher et al.

(10) Patent No.: US 6,631,636 B1
(45) Date of Patent: Oct. 14, 2003

(54) DEVICE FOR TESTING THE PRESENCE OF SMALL OR MINIMAL LEAKS IN THE HYDRAULIC SYSTEM OF VEHICLES

(75) Inventors: Franz Schleicher, Ingolstadt (DE); Wolfgang Schommer, Wadern-Bardenbach (DE); Karl-Heinz Ipfling, Saarlouis (DE)

(73) Assignee: Steinkrug GmbH & Co. KG, Ingolstadt (DE)

( * ) Notice: Subject to any disclaimer, the term of this patent is extended or adjusted under 35 U.S.C. 154(b) by 0 days.

(21) Appl. No.: 09/719,539
(22) PCT Filed: Jun. 17, 1999
(86) PCT No.: PCT/EP99/04197
§ 371 (c)(1), (2), (4) Date: Feb. 2, 2001
(87) PCT Pub. No.: WO99/65747
PCT Pub. Date: Dec. 23, 1999

(30) Foreign Application Priority Data

Jun. 17, 1998 (DE) ........................................ 298 10 807 U

(51) Int. Cl.$^7$ .............................. G01L 5/28; G01M 3/08
(52) U.S. Cl. ............................................. 73/121; 73/46
(58) Field of Search ..................... 73/121, 129, 862.38, 73/46, 47, 49.7; 340/425.5, 454

(56) References Cited

U.S. PATENT DOCUMENTS 4,307,604 A * 12/1981 Domitter ..................... 73/121
5,970,427 A * 10/1999 Greenwald ................... 73/121
6,357,290 B1 * 3/2002 Asao et al. .................. 73/129

* cited by examiner

Primary Examiner—Edward Lefkowitz
Assistant Examiner—Maurice Stevens
(74) Attorney, Agent, or Firm—Oblon, Spivak, McClelland, Maier & Neustadt, P.C.

(57) ABSTRACT

There is described a device for testing the hydraulic brake system of motor vehicles for the presence of small and extremely small leaks. To improve the performance while achieving the smallest possible overall size, the loading rod comprises a non-rotating spindle (6), which can be extended via a rotating nut (6.1), and which carries the measuring head (3). A bracing plate, which can move with low friction, is housed in resiliently displaceable manner in the measuring head (3).

1 Claim, 4 Drawing Sheets

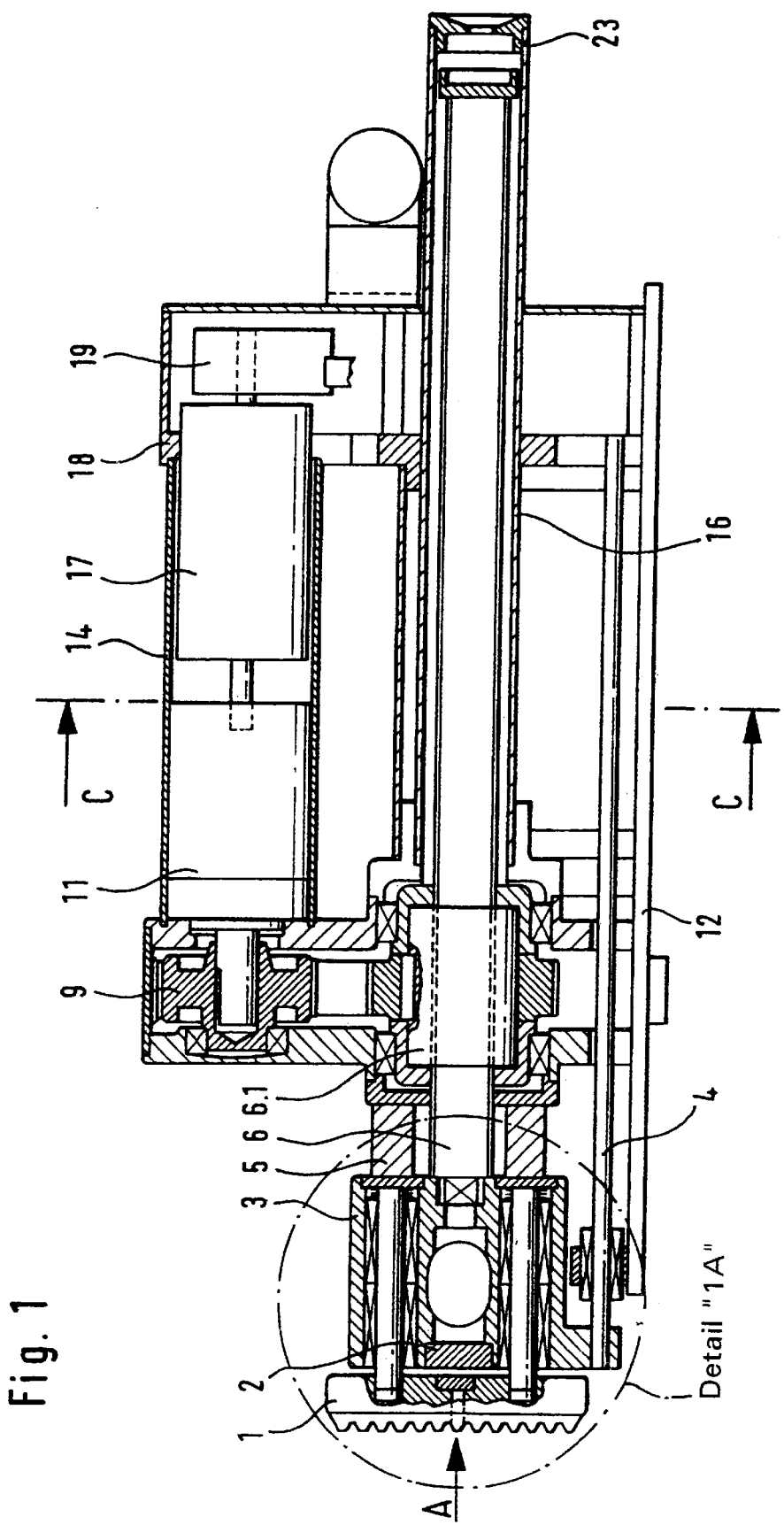

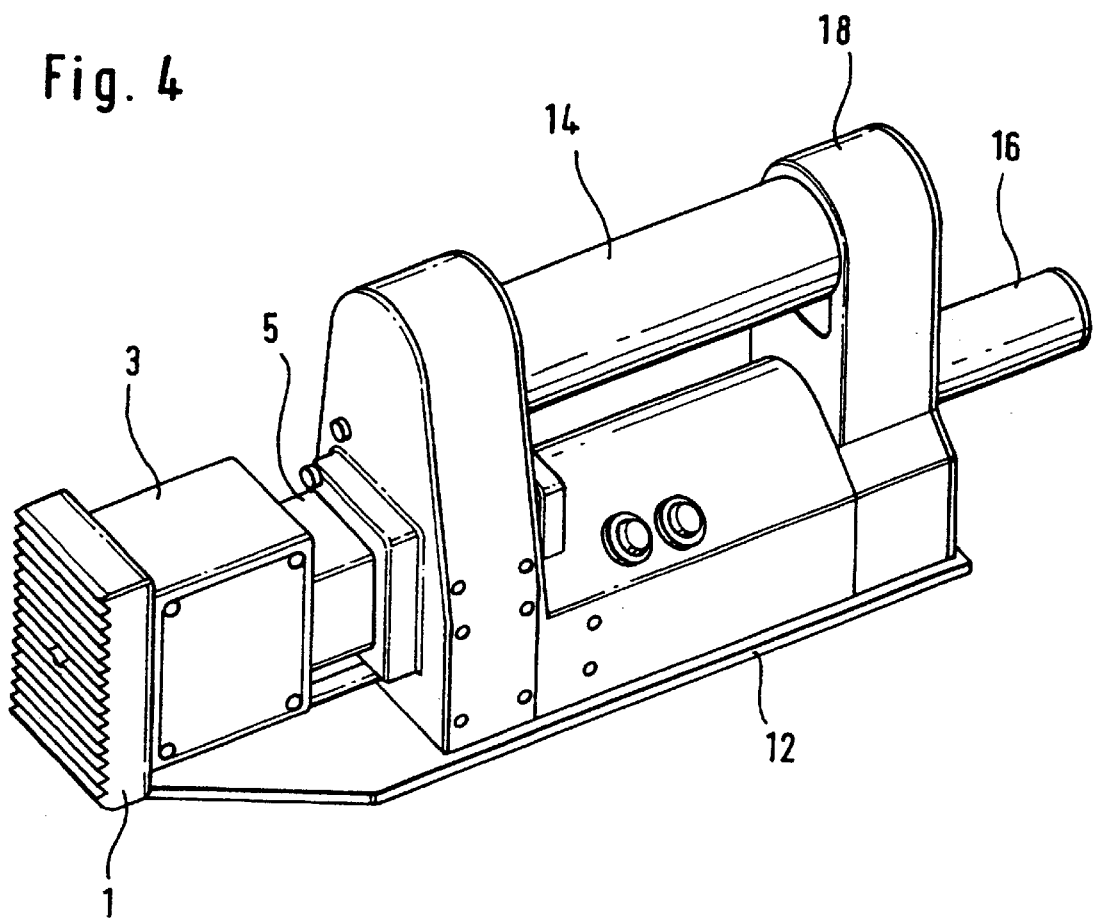

DEVICE FOR TESTING THE PRESENCE OF SMALL OR MINIMAL LEAKS IN THE HYDRAULIC SYSTEM OF VEHICLES

BACKGROUND OF THE INVENTION

1. Field of the Invention

The invention relates to a device according to claim 1 for testing the hydraulic brake system of motor vehicles for the presence of small and extremely small leaks. Such devices are needed for new motor vehicles and brake systems, in which it is necessary to test and confirm that no air or leaks is or are present in the hydraulic system of the brakes after this system has been filled. The device must be particularly well suited for this purpose without necessitating extensive modifications of the passenger compartment of the vehicle. A particularly important area of use of this device is the new-vehicle production line, so that when the vehicle is driven off manually at the end of the line the brake has already been tested and thus accidents in the plant are prevented.

2. Discussion of the Background

From European Patent Application 0392188 A1 there is known a device according to the preamble of claim 1. In that device the test force is applied by imparting rotational movement to a spindle of a ball screw via a spur-gear mechanism positioned at the rear end of the case. On the spindle there is seated a hollow rod, which extends from the rear end to the front end of the case, where it continues as solid rod 25.

BRIEF DESCRIPTION OF DRAWINGS

An embodiment of such an instrument is illustrated in the figures, wherein:

FIG. 4 shows a perspective view of the instrument.

DESCRIPTION OF THE PREFERRED EMBODIMENTS

Figure 1A:
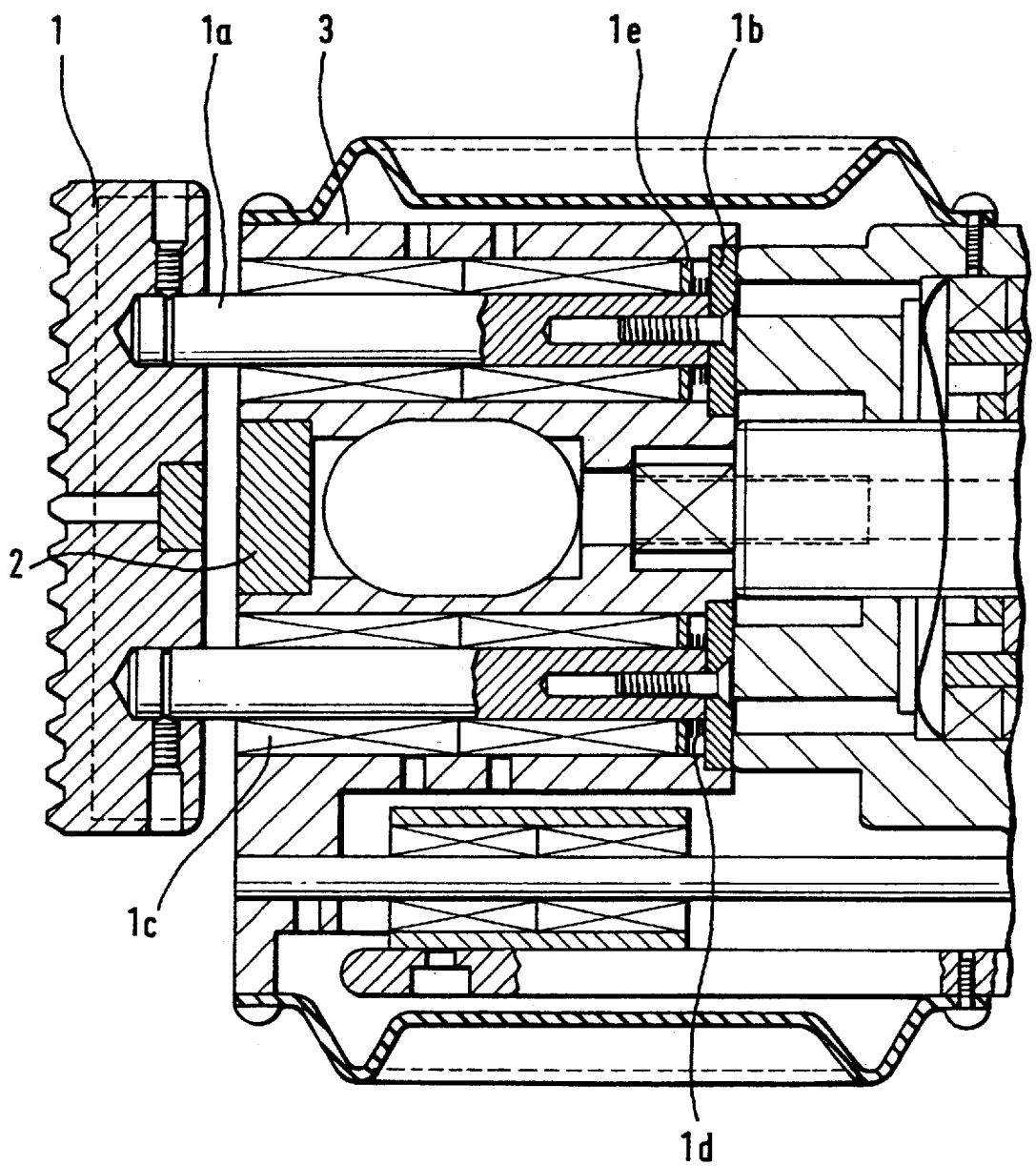
FIG. 1 shows a longitudinal section of the instrument.
Figure 3:
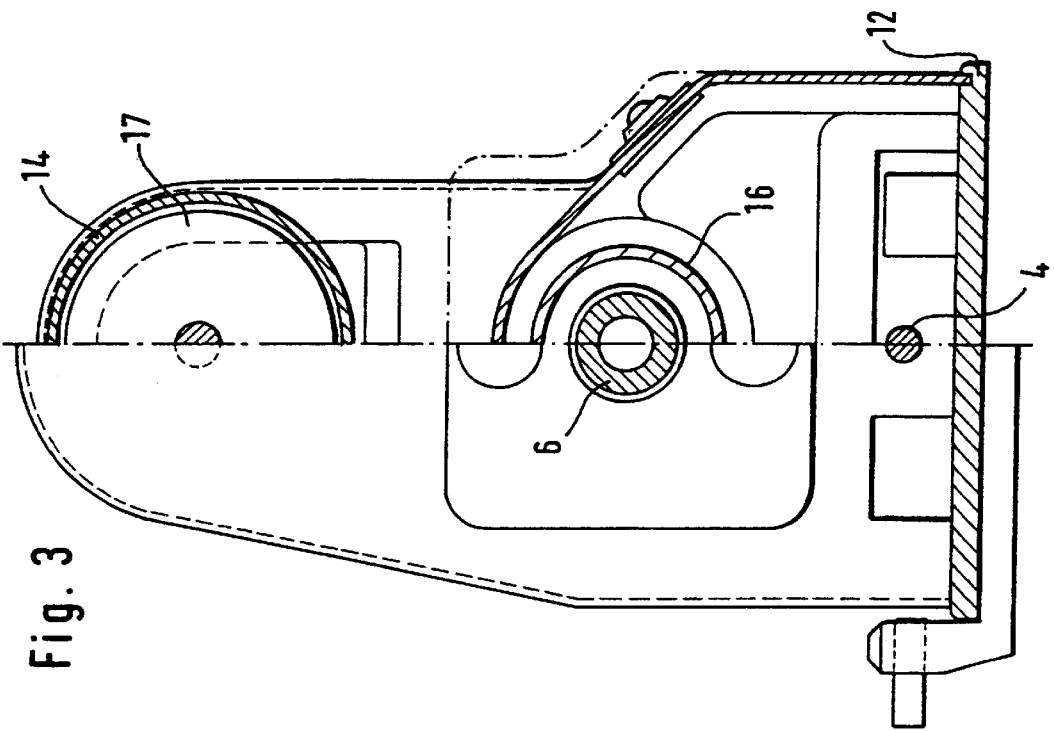
FIG. 3 shows Section C-C (one half) in FIG. 1.
Figure 2:
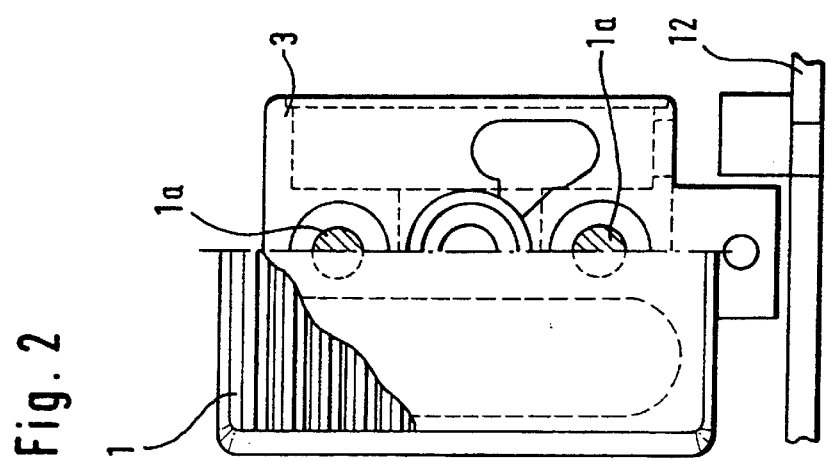
FIG. 2 shows view "A" on a larger scale, with part of the pedal sheet cut away.

As is evident from the figures, the device or the brake-testing instrument has a non-rotating spindle (6), which can be linearly displaced via rotatable nut (6.1), bears on the brake pedal via head (1) (e.g., a serrated plate) and, until the preset brake-holding force is reached in the course of the process, applies force to integrated pressure transducer (2), whose amplifier, which preferable is electronic, is disposed in measuring-head case (3).

Via its front end, spindle (6) carries a measuring head 3 which, by means of a guide rod, can be longitudinally displaced while being immobilized against rotation. A force sensor 2 is housed in measuring head 3. A serrated plate 1, which can move with low friction in axial direction, is housed in measuring head 3, spherical bushings 1c which cooperate with at least two guide pins 1a preferably being used. On the side facing away from serrated plate 1, guide pins 1a are connected by screw couplings to a pressure plate 1b, against which there is braced a compression spring 1d, which is braced via a further support disk 1e such that it is fixed relative to the case.

In the retracted position of the spindle shown in FIG. 1a, the pressure plates 1b are driven against a stop or pressure member 5, and so serrated plate 1 is raised from force sensor 2.

In other words, serrated plate 1 is braced resiliently against the measuring-head case, so that a force sensor housed in the measuring head is not subjected to any external force in the unloaded condition. Only when spindle 6 is displaced does measuring head 3 lift up from stop 5, whereupon springs id press serrated plate 1 into contact with sensor 2.

Pressure transducer (2) is preferably integrated with amplifier printed-circuit boards in measuring-head housing (3).

After the brake system has stabilized, a test force is input and maintained by closed-loop control at the test value. For this purpose the force is corrected as soon as it decreases to a predetermined value and the resulting displacement of the spindle is measured and supplied to an evaluation circuit.

In this way the signals of force-measuring pressure transducer (2) arriving in the higher-level control system together with signal inputs of an encoder (19) for the position or travel distance of the spindle indicate the existing leaks with variable time dependence, in that the test force is adjusted by closed-loop control to a preset value and, in the event of pressure decrease, the spindle displacement is corrected to maintain the test force established by closed-loop control.

The path of force between brake-pedal measuring head (3) through pressure transducer (2), spindle (6), a bracing protective tube (16) with conical socket (23) and a ball pin, not shown in more detail, of an at least two-dimensionally and preferably "3D-spring-mounted" adapter guide rail with fixation lies exactly on a line, so that load free of transverse forces is applied to the measuring system.

An anti-rotation safeguard in the form of a guide rod (4) prevents rotation of spindle (6).

The arrangement is set up such that - as can best be seen from the detail view in FIG. 1a- pressure transducer (2) is not under mechanical load in the retracted condition of spindle (6). For this purpose serrated plate (1) is braced resiliently via the guide pins of (3) on pressure members (5); this feature protects pressure transducer (2) from mechanical damage in the event, for example, that the device is dropped or that other external impacts are sustained on serrated plate (1).

The drive unit comprising motor (17) and gear mechanism (11) is enclosed by a protective tube (14), which simultaneously serves as a handle. Protective tube (14) stabilizes gear stage (9) with case (18) mounted on the motor side, thus forming, together with spindle protective tube (16) and a base plate (12), a frame that is at least doubly statically overdetermined.

Data transmission from the measuring head to an interface in case (18) takes place either by wireless means or by hard wiring in a trailing cable installation.

Preferably the instrument is positioned via a "2D- or 3D-spring-mounted adapter guide rail with fixation" on the seat rails of the vehicle, into which rails the reaction forces are dissipated.

The signals of force-measuring pressure transducer (2) as well as those of an encoder (19) for the position or differential travel distance of spindle (6), arriving concurrently in a higher-level control system, indicate existing leaks (2 to 3 drop theory), preferably with variable time dependence and automatic correction of the force applied by the spindle by adaptation of the extension distance traveled by the spindle during a pressure decrease.

The fact that the speed of spindle (6) is maintained by closed-loop control based on measurement of force increase imparts substantially higher repeating accuracy to this hydraulic-free test process. The instrument can be used reliably in the leg space of the vehicle driver—even for transmission of the opposing force, equivalent to the respective brake-pedal force, on the body of the passenger car. For this purpose the brake-testing instrument is mounted on a specially designed retaining frame, which is secured to the guide rails of the vehicle seat. The arrangement is set up such that the test instrument is positioned movably or in spring mountings with at least two (2D-spring mounted) and preferably three degrees of freedom, so that the brake force can be transmitted via spindle (6) to the pedal in a manner free of transverse forces, when the pedal is swiveled during the brake test and its orientation changes relative to the spatially fixed rails of the vehicle seat. One degree of freedom runs parallel to the seat rails. A second, rotational degree of freedom is defined by a horizontal axis which preferably runs parallel to the axis of the brake pedal. A further rotational degree of freedom is defined around a vertical axis, whereby alignment errors can be compensated for. Measurement errors can be reliably excluded with this structure.

By using the brake-testing instrument, therefore, the displacements of the brake pedal are measured for predetermined forces and are evaluated per factory specification. This instrument can be operated easily and simply, and the test sequence can be performed fully automatically. As soon as the predetermined braking force has been reached, the actual displacement of the brake pedal is measured. By the fact that a constant force acts on the hydraulic piston over a predetermined time unit, leaks can be detected by yielding of the brake pedal, a phenomenon that correlates with the movement of the hydraulic piston.

The individual steps during operation of the device will be explained hereinafter:

Install test instrument in the vehicle

Worker presses start button

Execute priming strokes intelligently in order to condition the brake system

Apply bursting pressure

Execute test stroke

Record measured values continuously

Perform leak test

Return to home position

Output the results

Remove from the vehicle

It has been found in practice that false errors have been detected if the brakes are not 100% preconditioned. The costs due to "false errors" are unacceptable. This error rate can be excluded by introducing additional conditioning strokes.

These additional strokes substantially represent power. In order to ensure such power, a servo drive with intelligent servo controller is used. The result is high speed combined with large pedal force. The built-in intelligence ensures that the speed is subjected to continuous closed-loop control as a function of force. This means that the motor runs very rapidly at small pedal forces (or when idling) and slows down only at the end of the travel distance, when the forces are large. This leads to a time-optimized movement of the pedal-loading means. The additional intelligence of the software recognizes an already preconditioned brake. The number of priming strokes is no longer constant, but will be controlled automatically via the software. Thus one vehicle may be tested after as few as two priming strokes, where another may need as many as four priming strokes. This intelligence saves time and energy.

The need for time-saving measuring technology was met by the use of incremental displacement sensors for length measurement load cell for the pedal force The displacement sensor is seated directly on the motor flange and delivers interference-immune digital pulses with a measurement accuracy of 0.01 mm. The load cell achieves an accuracy of 1 N. To prevent damage to the load cell, it is free of constraints in home position. Even if the instrument is dropped or struck with a hammer, the load cell cannot be damaged. Its reliability and availability is ensured.

The simple structure of the instrument makes it easy to maintain. Because of the construction of the instrument and of the seat rail, transverse forces are no longer developed in the handset. Force is input directly through the shaft, whose end is the bearing point of the instrument. In addition, the seat rail is spring-mounted both horizontally and vertically. Because of these features wear of the instrument is greatly reduced.

The software is a Windows NT application. It controls the entire test sequence. All of the collected experiences have led to an optimized sequence. Standardized elements permit convenient and easy operation. Working with the Windows interface promotes high acceptance by the operators. The main features are:

Standardized Windows NT application

Graphical interface

Easy operation

Continuous recording of measured values during the test sequence with graphic display of the test sequence Intelligent sequence control Diagnosis Convenient printout Several leak-test capabilities Interface to ProPedal evaluation software The leak test can be performed in three different ways.

Measurement of the force decrease

Measurement of the force decrease and also of the displacement needed to restore the force to the nominal value once again after the test time.

Continuous closed-loop control of the force to the nominal value and recording of the displacement necessary for this purpose.

In addition, by means of a zoom function, the measured values can be displayed at various magnifications in the graphic display of the measured curve. In borderline situations (such as only minimal deviations from limit values), a printout of this curve, evaluated by an expert, can prevent additional rework.

The main advantages of the invention can be summarized as follows

1. Light weight (still only 4 kg)
2. Shorter overall size and at the same time longer stroke (200 mm standard stroke length, 390 overall length)
3. Forces up to 130 kg can be measured
4. The same instrument is universal for right-hand and left-hand drive vehicles
5. Start and stop buttons provided on both sides
6. Linear path of force in the instrument during the test
7. Greater measurement accuracy due to use of time-saving measuring technology (incremental displacement sensor and electronic load cell)

8. Higher resolution during the leak test because of constant correction of the force (see test requirements of the automotive industry)
9. Greater test speed because of faster drive
10. Automatic closed-loop control of speed via measurement of force increase
11. Improvement of the seat rail by horizontal and vertical spring mounting to compensate for transverse and bending forces that occur
12. Easy to service (for example, all cables in and to the instrument can be connected with plugs)
13. New improved software
14. Several "leak-test capabilities" via internal software
15. Standard PC for control and evaluation (for example, Siemens-Nixdorf)
16. Up to 4 handsets to be operated simultaneously can be connected to each electrical cabinet (for example, calibration of one instrument while the other instruments are in service)
17. Windows NT 32-bit software
18. Convenient parameter and diagnosis program
19. Data evaluation and archiving via Prodama software
20. Statistical evaluation possible, while the instruments are operating
21. Curve diagrams possible
22. Connection for radio scanner
23. Statistics or evaluation software expandable to meet customer's wishes The features of the instrument are used to optimal advantage when the following sequence of functions is adopted:

1. The operator (man or woman) first installs the adapter rail (seat rail) in the seat-fastening rails of the vehicle.
2. The actual test instrument is installed in this adapter rail.
3. Only then is the start button pressed.
4. The further test sequence runs automatically.
5. The instrument first begins to apply the so-called priming strokes (1 to 3 strokes). These strokes are needed to bring the brake linings into contact and to prime the entire brake system. The number of strokes can be adjusted to a fixed value or the strokes can be ended automatically when a predetermined opposing force has been reached (time savings).
6. The actual test stroke (measuring stroke) then begins. For this purpose the measuring head of the instrument travels forward until it reaches the pedal. This so-called "first displacement" is measured and compared with stored tolerance values.
7. This measurement monitors the mechanical mounting of the brake pedal and supplies the base values for the further measurements.
8. The displacement from the point at which the pedal is reached to that at which the predetermined test force is established is in turn measured. On the basis of this value the brake system is checked to determined whether it is full or contains air inclusions.
9. These measurements are followed by a so-called stabilization time (damping time). The only action during this time is force correction in order to maintain the test force constant at the predetermined value.
10. After the end of the stabilization time, the measuring system is zeroed once again. Thereafter the so-called "leak test" is performed. For this purpose the yielding of the brake during a stipulated time is checked by displacement measurement. The purpose of this test is to detect small and extremely small leaks in the brake system. This "leak test" can be performed in three different ways depending on customer wishes and/or vehicle.
11. After completion of this test (OK/not OK and/or the complete measured values).
12. After completion of the measurement, the measuring head of the instrument automatically returns to home position.
13. The operator (man or woman) removes the instrument as well as the adapter rail and proceeds to the next vehicle.

During the measurement, all data are displayed on the monitor. The display is retained until the instrument is next started.

If the vehicle is "not OK", a decision is made between "air in brake" or "leak", so that the repair department can already receive selective information. This naturally helps to shorten the repair time substantially and thus represents a systematic cost savings.

All test data are archived on the hard disk until the computer's capacity is reached. Obviously an option is to transfer the data to a higher-level control computer (for example, via Modbus plus, TCP/IP, Ethernet, H1 bus, etc.).

A statistics program is also integrated into the software.

For different brake systems (vehicle types), in which different tolerance parameters are needed for operation, an optional capability is to read in these parameters directly via radio scanner, bar codes or control computer. In this way manual selection of any test program that may be necessary is obviated.

By means of expanded software (an option) and linking with brake-filling systems connected on the inlet side, the test instrument can also be used for preventive servicing, early fault detection and thus for cost and time savings.

What is claimed is:

1. A device for testing the hydraulic brake system of motor vehicles for the presence of small and extremely small leaks, with a case on which there is seated, at a position offset along the axis, with interposition of a gear stage, a drive motor for an actuating member, which can be extended from the case and which applies the test force, characterized in that the gear stage is disposed on the front side of the case considered in extension direction and is in geared engagement with an axially fixed rotatable nut, by which there can be driven the actuating member, which is constructed as a spindle that cannot rotate but can move axially, and which at its projecting front end carries a measuring head, where the spindle is disposed concentrically within the nut.

* * * * *